Sept. 27, 1960   J. E. DOUGLAS ET AL   2,953,886
SUGAR CANE HARVESTER WITH CUTTING APPARATUS
Filed Sept. 11, 1957   5 Sheets-Sheet 1

INVENTORS.
JACK ERRINGTON DOUGLAS
JAMES WOOD
BY
Carlson, Pitzner, Hubbard & Wolfe
ATTORNEYS.

Sept. 27, 1960  J. E. DOUGLAS ET AL  2,953,886
SUGAR CANE HARVESTER WITH CUTTING APPARATUS
Filed Sept. 11, 1957  5 Sheets-Sheet 3

INVENTORS.
JACK ERRINGTON DOUGLAS
JAMES WOOD
BY
Carlson, Pitzner, Hubbard & Wolfe
ATTORNEYS.

Sept. 27, 1960     J. E. DOUGLAS ET AL     2,953,886
SUGAR CANE HARVESTER WITH CUTTING APPARATUS
Filed Sept. 11, 1957     5 Sheets-Sheet 4

INVENTORS.
JACK ERRINGTON DOUGLAS
JAMES WOOD
BY
Carlson, Pitzner, Hubbard & Wolfe
ATTORNEYS.

Sept. 27, 1960 J. E. DOUGLAS ET AL 2,953,886
SUGAR CANE HARVESTER WITH CUTTING APPARATUS
Filed Sept. 11, 1957 5 Sheets-Sheet 5

INVENTORS.
JACK ERRINGTON DOUGLAS
JAMES WOOD
BY
Carlson, Pitzner, Hubbard + Wolfe
ATTORNEYS.

United States Patent Office 2,953,886
Patented Sept. 27, 1960

2,953,886

SUGAR CANE HARVESTER WITH CUTTING APPARATUS

Jack Errington Douglas and James Wood, Melbourne, Victoria, Australia, assignors to Massey-Ferguson (Australia) Limited Filed Sept. 11, 1957, Ser. No. 683,371

3 Claims. (Cl. 56—17)

The present invention relates to harvesting machines and more particularly to a machine for topping, cutting, chopping and loading sugar cane.

It is the general aim of the invention to provide a compact, economical harvesting machine which effectively and efficiently harvests sugar cane by trimming the tops of the cane, severing the cane from its roots, chopping the cane into short lengths and loading the short lengths into a conveying vehicle.

It is a more detailed, but related, object to provide a machine of this type which may be conveniently coupled to the side of a tractor for operation as a harvester and which will function to load the chopped cane into a trailer pulled by the tractor.

In one of its aspects, it is an object of the invention to provide a novel chopping mechanism for a cane harvester which is highly efficient, simple and economical to manufacture and yet capable of handling high tonnages of harvested cane without necessity for frequent cleaning or other service. More specifically, it is an object to provide a novel chopping mechanism of the above type that is self-cleaning so as not to become clogged with the sticky sugar cane pith which tends to build up a hard mass effective to destroy the cutting ability of a cane chopper.

It is a further object to provide a chopping mechanism as characterized above which is self-feeding so as to effectively simplify the required cane guiding and feeding structure of the harvester.

Other objects and advantages of the invention will become apparent upon reading the attached detailed description and upon reference to the drawings in which.

While the invention will be described in connection with a preferred embodiment, it will be understood that we do not intend to limit the invention to that embodiment. On the contrary, we intend to cover all alternatives, modifications, and equivalents as may be included within the spirit and scope of the invention as defined by the appended claims.

Figure 1:
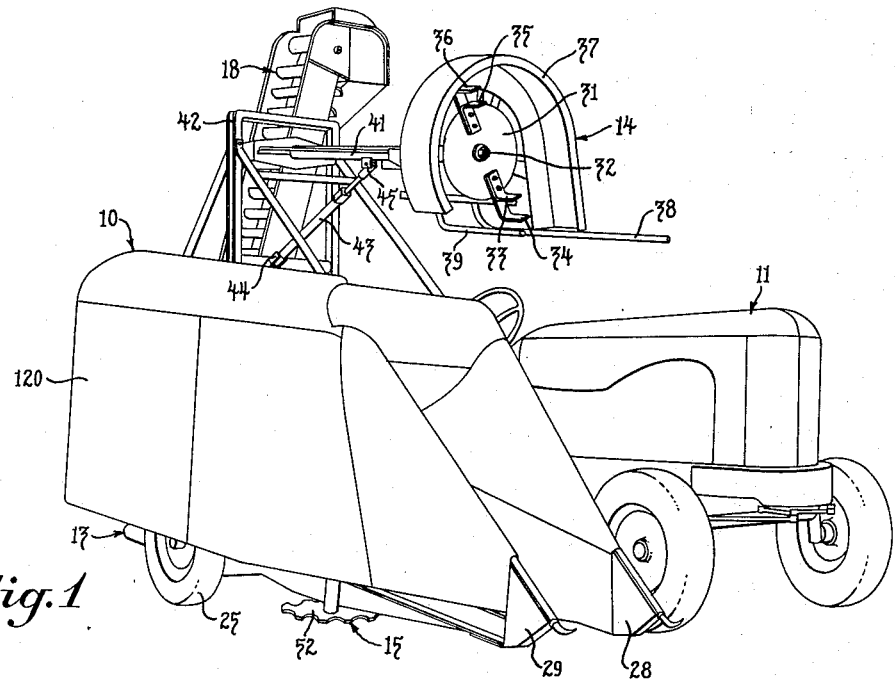
Figure 1 is a perspective view of a harvester, embodying the present invention, coupled in operating position to the side of the tractor.
Figure 2:
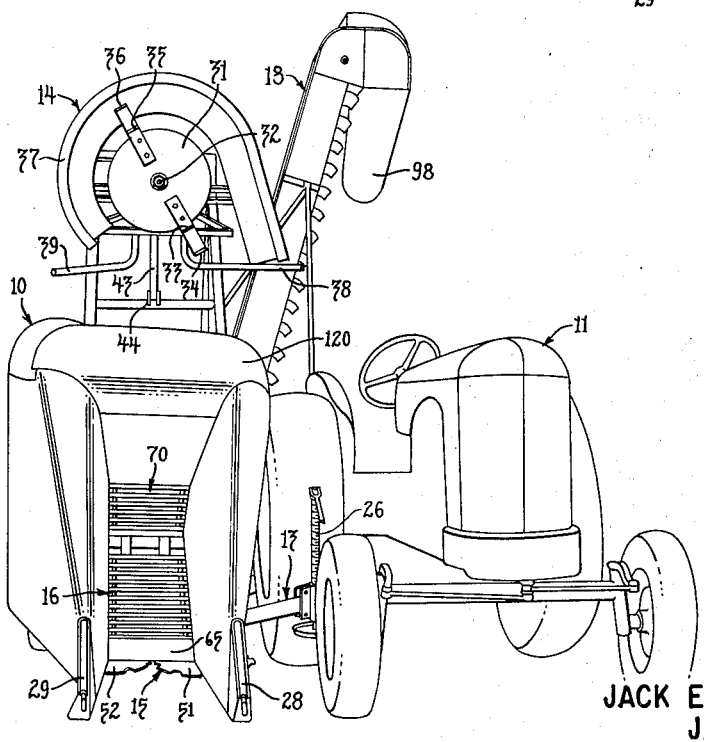
Fig. 2 is a front view of the harvester and tractor combination shown in Fig. 1.

Turning first to Figs. 1 and 2, there is shown a harvester 10 embodying the present invention operatively coupled to the side of the conventional tractor 11. Hitched to the rear of the tractor 11 is a loading trailer 12 (see Fig. 3). When so connected, the entire assembly constitutes a complete sugar cane harvesting apparatus in which the tractor 11 is operable to drive the harvester 10 along rows of cultivated sugar cane whereupon the harvester 10 is effective to harvest the cane and deposit it in the trailer 12.

In keeping with the invention, the harvester 10 includes a frame 13 releasably secured to the side of the tractor 11 for movement therewith. The frame supports a forwardly extending top cutter 14 effective to trim the tops of the cane being harvested, a cane cutting mechanism 15 for cutting down the harvested cane, and an apron conveyor 16 for conveying the cut cane to a cane chopping mechanism 17 in which the cane is chopped into short lengths. The chopped cane is then conveyed via an endless conveyor 18 and deposited in the trailer 12.

Figure 5:
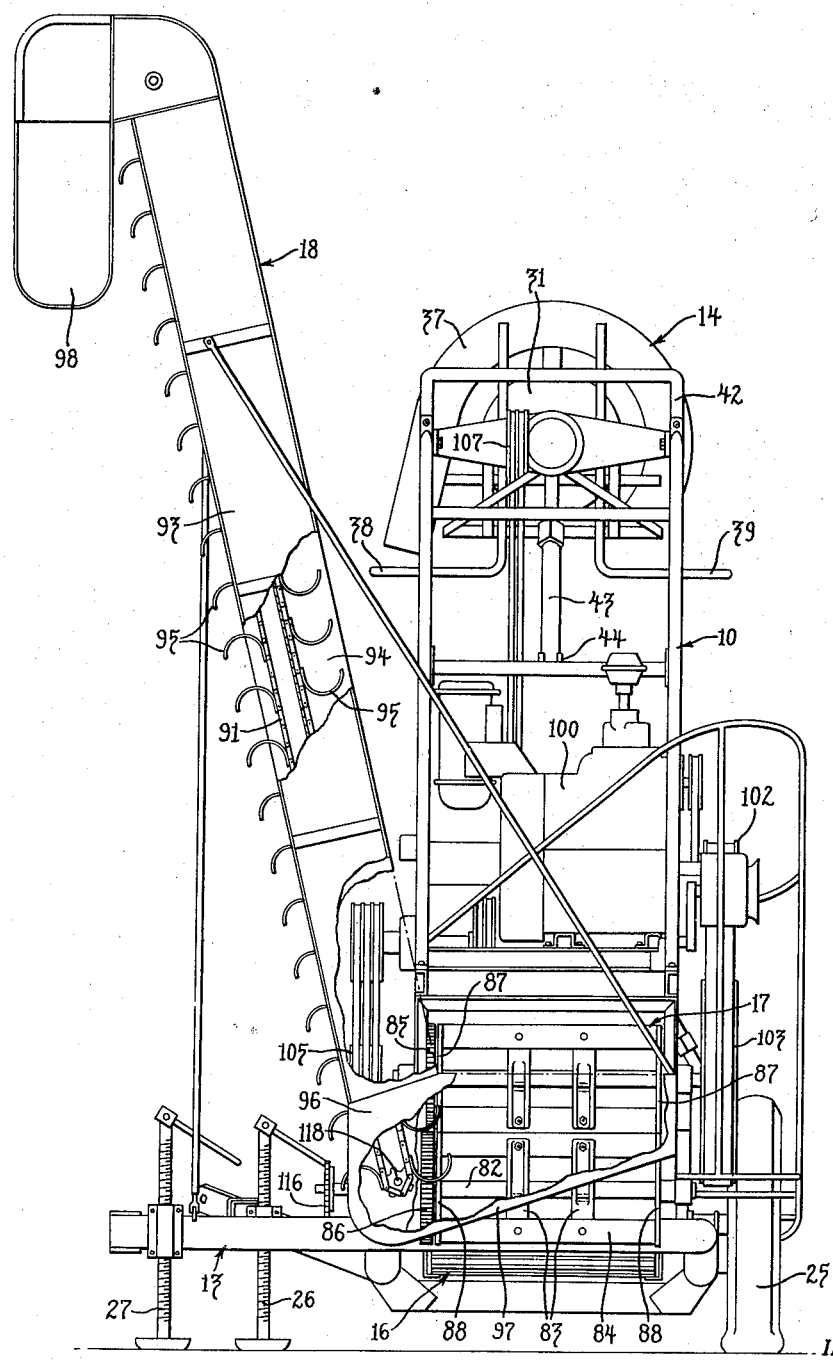
Fig. 5 is a slightly enlarged end view of the harvester shown in Fig. 1 partially in section.

The frame 13 in the illustrated machine comprises a generally U-shaped member 21 adapted to be releasably secured to the tractor 11 by means of a side tractor bracket 22 (see Fig. 3) and a connection 23 mounted on a drawbar 23a fixed between the rearwardly extending draft links 24 of the tractor. A side wheel 25 is journaled on the frame so as to support the outboard side thereof. When the harvester 10 is disconnected from the tractor 11 (Fig. 5) it is maintained in a generally upright position by means of a pair of adjustable jacks 26, 27 secured to the U-shaped member 21 near its outer ends.

Extending forwardly of the frame 13 are a pair of pointed guide structures or snouts 28, 29, intended to pass on either side of the cultivated cane rows during the harvesting operation so as to funnel the cane into the harvester and lift sharply bent over cane stalks to a generally upright position.

The forwardly extending top cutter 14, in the present embodiment, comprises a disk 31 fixed to a driven shaft 32 and provided with opposed pairs of axially extending cutter blades 33, 34 and 35, 36. The blades 33–36 are provided with side cutting edges and it will be understood that as the disk 31 is rotated the blades will describe a cylindrical cutting arc effective to trim the tops of the cane moving rearwardly relative to the harvester 10 and into the cutting arc.

The rotating disk and blades of the top cutter 14 are provided with a semi-circular protective shield or housing 37 opened at the bottom so that the standing cane may pass into engagement with the cutting blades. The cutter 14 is also provided with a pair of outwardly deflected gathering arms 38, 39 which are effective to gather and direct the tops of the cane to be harvested into the cutting arc of the blades.

The entire top cutter assembly is mounted on a forwardly extending tube 41 which is pivoted to an upstanding bracket structure 42 comprising a part of the harvester frame 13. In order to adjust the vertical position of the top cutter 14, an adjustably extensible link 43 is pivoted at 44 to the bracket 42, and at 45 to the tube 41. The link 43 comprises two telescoping sections whose combined length may be adjustably varied so as to tilt the tube 41 about its pivotal connection with the bracket 42 and thereby permit vertical adjustment of the top cutter 14.

Figure 3:
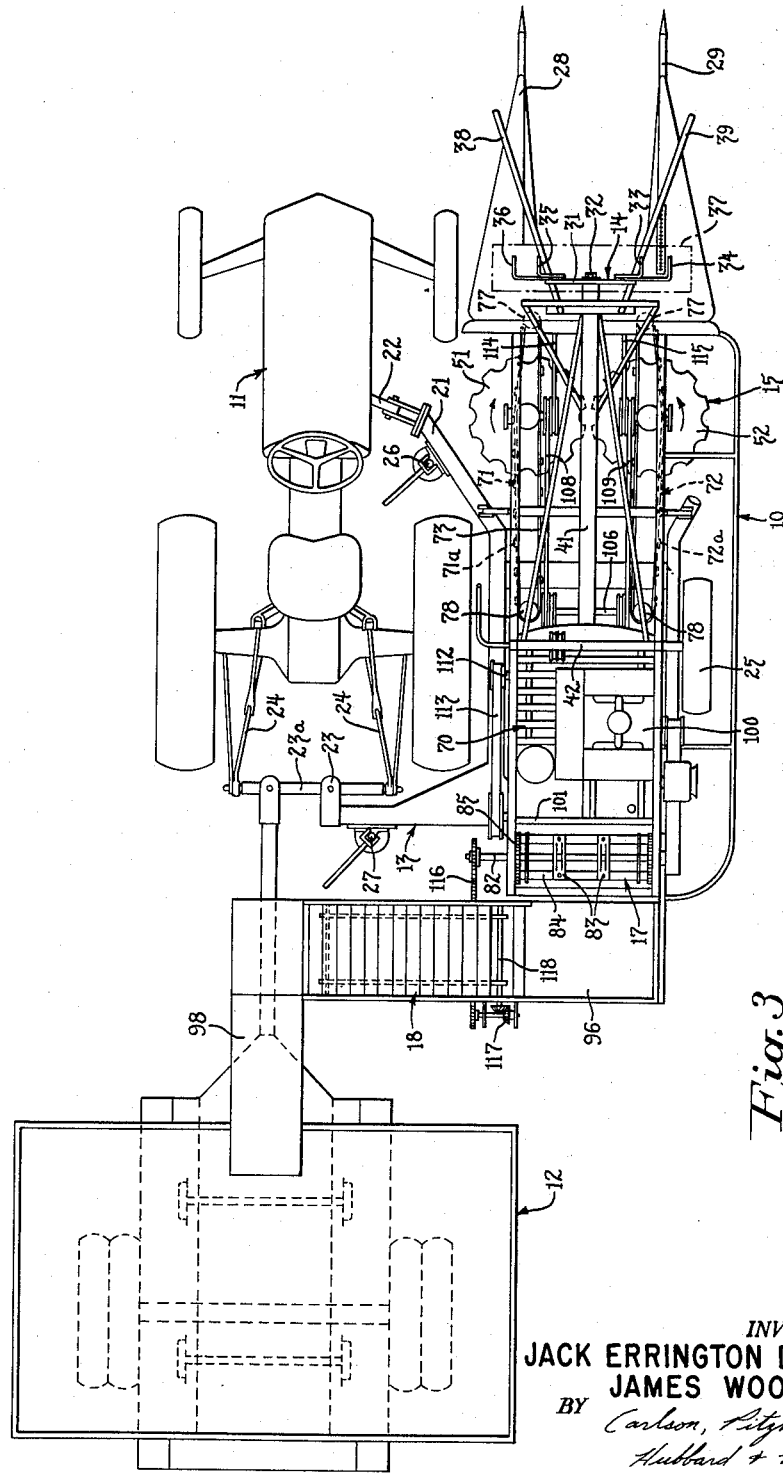
Fig. 3 is a plan view of the harvester shown in Fig. 1, with the protective cover shields removed, coupled to the side of a tractor which also is shown, drawing a loading trailer.

The cane cutting mechanism 15 in the preferred embodiment, comprises a pair of peripheral adjacent disks 51, 52 alined in a plane closely overlying the ground surface upon which the harvester 10 operates. The disks are fixed to upstanding shafts 53 which are journaled in tubes 54 that are fixed to the machine frame 13. Each of the tubes 54 is slightly tilted forwardly so as to incline the disks 51, 52 in a downwardly and forwardly sloping direction. The peripheries of the disks 51, 52 are serrated and formed as cutting edges so that rotation of the disks in the direction of the arrows shown in Fig. 3 is effective to sever upstanding cane just above the ground. The upward slope of the disks 51, 52 is effective to impart a slight upwardly thrusting movement to the severed cane so that the lower or butt end is lifted and thrown rearwardly onto the apron conveyor 16.

Figure 4:
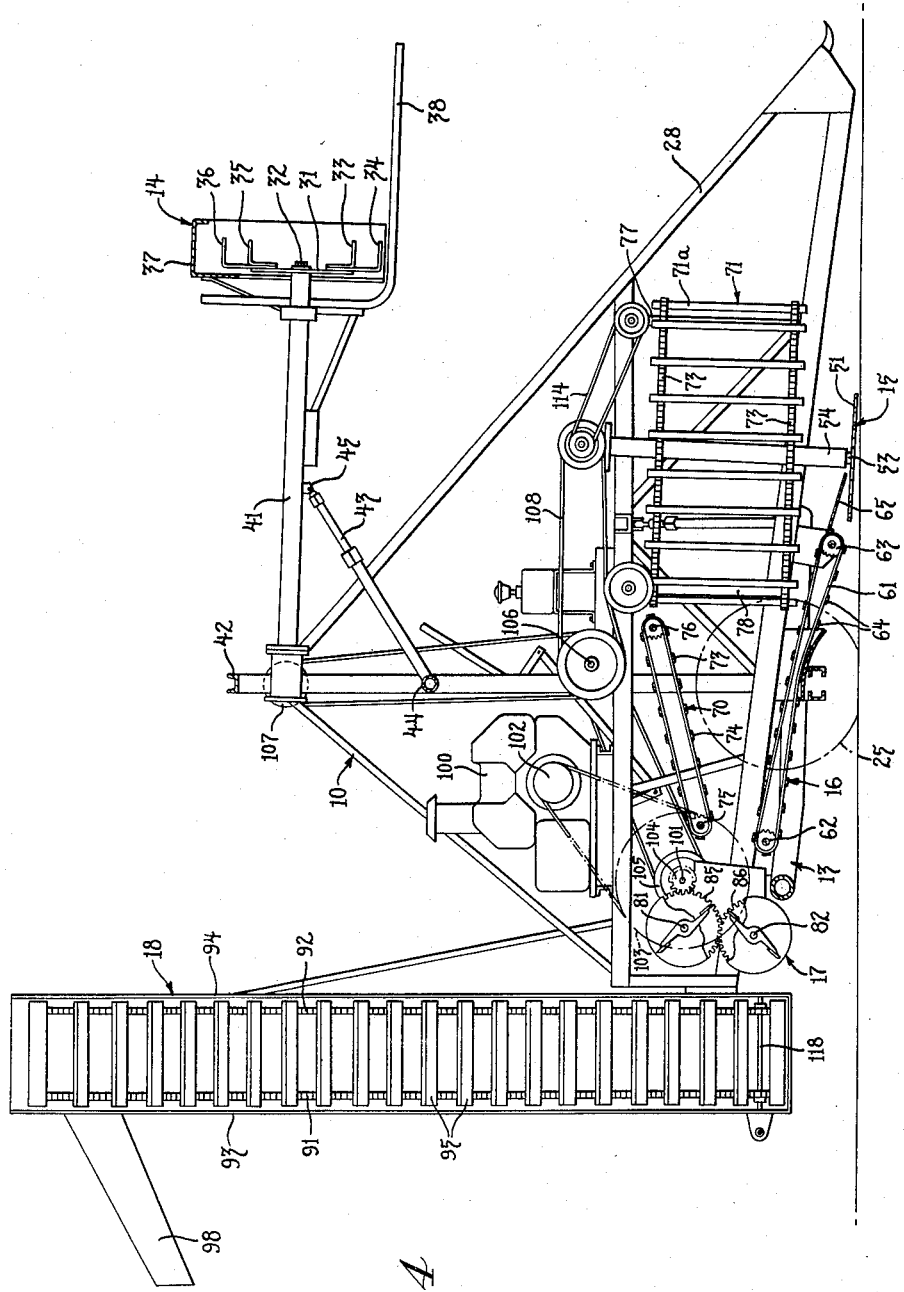
Fig. 4 is an elevation view, partially in section, taken approximately along the centerline of the harvester shown in Fig. 3.
Figure 6:
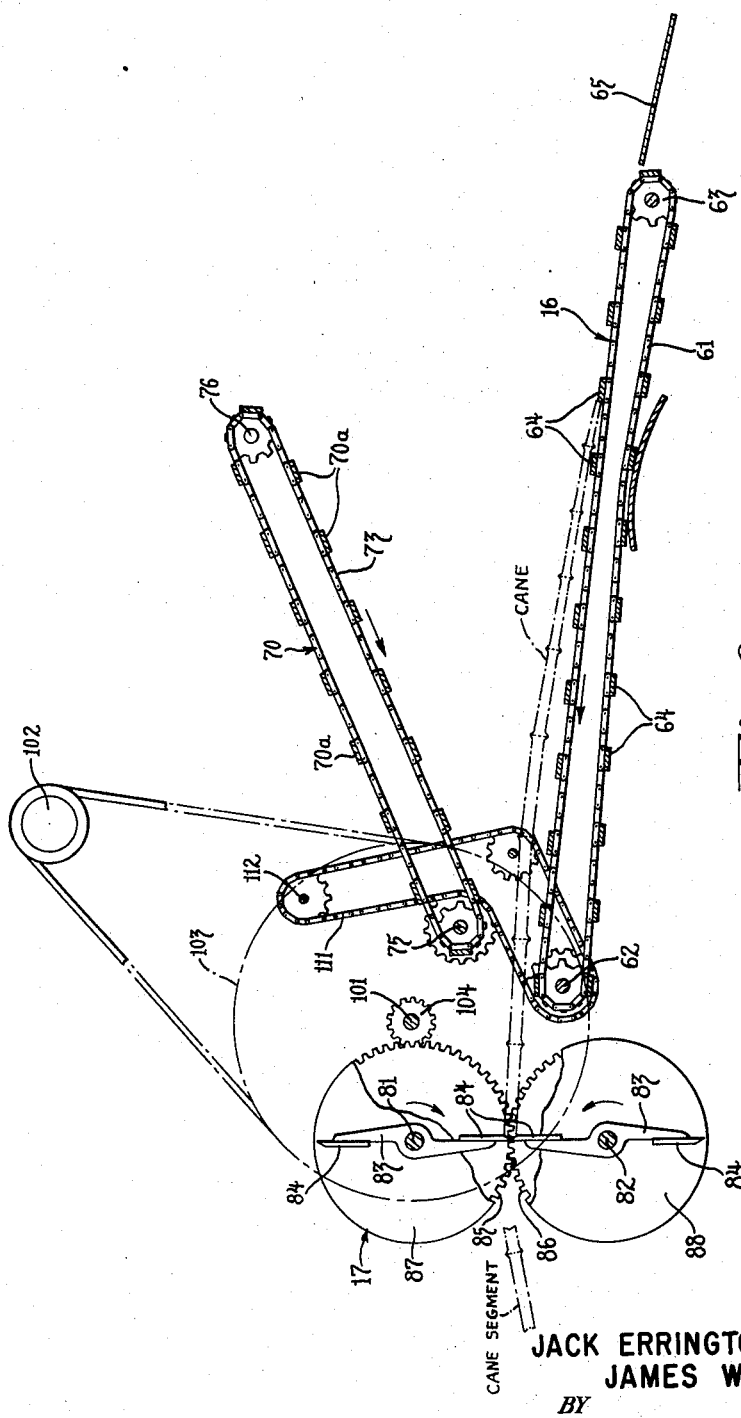
Fig. 6 is an enlarged fragmentary view of the cane conveyor and chopping mechanism of the harvester, together with the drive therefor.

The apron conveyor 16, in the illustrated embodiment, is formed of a parallel pair of chain loops 61 trained about sprockets on shafts 62 and 63 (see Fig. 6). Forming the carrying surface of the conveyor are a plurality of slats 64 positioned transversely of the machine 10 and secured to each of the chains 61. It will be noted in Fig. 4 that the conveyor 16 is inclined upwardly from the cane cutter mechanism 15 so as to transport the cane to the chopping mechanism 17. In order to insure that the cut cane is properly transferred from the cutting mechanism 15 to the apron conveyor 16, an inclined receiving plate 65 is positioned on the frame just above the cutting disks 51, 52 and is sloped upwardly to the front end of the apron conveyor 16.

To assist the apron conveyor 16 in conveying cut cane through the harvester 10, a top conveyor 70 and a pair of side conveyors 71, 72 are provided. The conveyors 70, 71 and 72 are constructed in a manner similar to that of the apron conveyor 16. That is, the top and side conveyors comprise spaced pairs of parallel chains 73 carrying cross slats 70a to 72a, respectively. The top conveyor 70 is trained about sprockets secured to transverse shafts 75, 76, while the side conveyors 71, 72 are trained between sprockets secured to a pair of forward upstanding shafts 77 and a pair of rearward upstanding shafts 78 (see Fig. 3).

The side conveyors 71, 72, together with the apron conveyor 16 and the top conveyor 70, combine to form a converging tunnel leading from the open throat defined by the guides 28, 29 at the front of the harvester 10 back to the chopping mechanism 17. In the illustrated machine, the top cutter 14 is disposed forwardly of the cane cutting mechanism 15 so that upright cane being harvested will first be tilted forwardly upon engagement with the top cutter 14 before the cane is severed by the cutting mechanism 15. The cane thus tends to fall forwardly and will pass, butt end foremost, onto the apron conveyor 16 for transport rearwardly through the harvester.

However, in actual practice, sugar cane often grows relatively angled and individual stalks are bent and twisted so that the cane in a cultivated row may present a thick tangled appearance. When cane of this nature is severed by the mechanism 15 of the harvester, it is quickly urged into proper alinement by the converging tunnel defined by the conveyors 16, 70–72. The cane is directed toward the center of the harvester by the side conveyors 71, 72, and is pressed downwardly and carried properly oriented toward the chopping mechanism 17 by the top conveyor 70 and the apron conveyor 16.

In carrying out the invention, the chopping mechanism 17 includes a pair of parallel spindles rotatably driven and carrying cooperating cutting blades phased edge-to-edge which are effective to grip the cane, carry it rearward from the apron conveyor 16, sever the cane into short lengths, and throw the severed cane rearwardly for collection. In the present embodiment, the chopping mechanism spindles comprise a vertically spaced pair of horizontal shafts 81, 82 journaled in the frame 13 of the harvester and carrying brackets 83 on which are mounted elongated and radially disposed cutting blades 84. In the preferred embodiment, two blades are mounted on each of the spindle shafts 81, 82 and arranged at 180° from one another.

The spindles of the chopping mechanism 17 are rotatably coupled by means of meshing gears 85, 86 fixed to the spindle shafts 81, 82 respectively. The gears are of equal size so that the spindles will rotate synchronously but in opposite directions.

To perform the chopping function, the spindles are angularly alined so that the cutting blades 84 on the respective spindle shafts are brought into close proximity edge-to-edge incident to rotation of the spindle shafts. It will therefore be apparent that as the spindles rotate in the direction of the arrows shown in Fig. 6, the blades 84 on the respective spindle shafts will swing toward each other and grip the cane therebetween. The blades 84 and their supporting brackets 83 on each of the spindles lie virtually in a single plane so that the blades sweep through an unobstructed arc to facilitate the gathering and gripping action. Further rotational movement of the cutting blades will draw the cane rearwardly until the blades cooperate in severing the cane. As the blades continue to rotate, they impart a kicking force to each severed cane segment effective to throw the segments rearwardly from the chopping mechanism 17.

In order to continuously guide the cane through the chopping mechanism, each of the spindle shafts 81, 82 is provided with pairs of disks 87, 88 respectively, secured thereto adjacent the ends of the blades 84. The disks 87 are aligned with the disks 88 so that they combine to form side walls for the chopping mechanism effective to prevent the cane from moving out of reach of the blades.

It will therefore be seen that no special feeding apparatus is required to pass the cane through the chopping mechanism 17 since the mechanism itself is effective to grasp the cane as it emerges from the converging tunnel formed by the conveyors 16, 70–72. The cane continues to be guided by the disks 87, 88 as it is chopped into segments, and the action of the rotating blades 84 throw the segments rearwardly. Thus, the mechanism required to feed and guide cane through the harvester 10 is greatly simplified.

Since the cutting blades 84 are radially disposed on their respective spindles, and since they are intended to rotate at rather high speeds, it can be seen that the blades tend to be self-cleaning. To understand this function it will first be appreciated that sugar cane possesses a soft pith containing the sticky sugar sap. When the cane is cut, the sap tends to flow onto the cutting elements and dry to leave a hard mass that gradually builds up on the cutting elements. This mass soon destroys the efficiency of conventional cutting elements and may even stop the operation entirely so that it is necessary to shut down periodically for cleaning. However, in the present device the cooperative cutting blades 84 are disposed in radial alinement about their axis of rotation and this construction, combined with the high speed of rotation, tends to cause the sticky sap flowing from the severed cane to be thrown by centrifugal force clear of the blades before it has an opportunity to harden and form the undesirable hard mass. In this way, the chopping mechanism 17 tends to be self-cleaning and thus effective to handle high tonnages rapidly and efficiently without necessity for shut-down.

The endless conveyor 18, which is utilized to deposit the chopped cane segments into the trailer 12, comprises, in the illustrated embodiment, a pair of chains 91, 92 rotatably mounted between upwardly inclined side walls 93, 94 which carry a plurality of lifting pans 95. At the bottom of the endless conveyor 18 is located a bin 96 having an inclined bottom 97 (see Fig. 5) which is effective to receive the severed cane segments thrown rearwardly by the chopping mechanism 17 and allow them to roll downwardly along the bin bottom 97 to a point where they will be picked up by the lifting pans 95 and carried upwardly along the endless conveyor 18.

At the top of the endless conveyor 18, a rearwardly inclined chute 98 is positioned to receive the cane segments dumped from the lifting pans 95. The chute 98 extends rearwardly above the trailer 12 and thus is effective to direct the cane segments from the endless conveyor 18 into the trailer 12.

In the illustrated embodiment the various rotatably driven mechanisms making up the harvester 10 are powered from a single engine 100 mounted on the harvester frame 13. The engine 100 drives a power shaft 101 through the medium of belt connected pulleys 102 and 103 (see Fig. 6). The power shaft 101 rotates the chopping mechanism 17 by means of a gear 104 secured to the shaft and positioned in meshing engagement with the gear 85 fixed on the spindle shaft 81.

The top cutter 14 is driven from the power shaft 101 by means of a pulley 105 on the power shaft (see Fig. 4) that is connected to an intermediate shaft 106, which in turn, drives a pulley 107 journaled at the top of the bracket 42. The pulley 107 is connected through suitable worm gearing, not shown, to the top cutter shaft 32 which extends from the rear end of the tube 41.

In order to drive the can cutting mechanism 15, the intermediate shaft 106, driven by the power shaft 101, is connected by means of belts 108, 109 (see Figs. 3 and 4) to suitable worm gearing effective to drive the vertically alined shafts 53 upon which the cutting disks 51, 52 of the cutting mechanism are mounted.

The apron conveyor 16 and the top conveyor 70 are driven by a chain 111 (see Fig. 6) trained about sprockets secured to both of the shafts 62 and 75 upon which the conveyors 16 and 70 are respectively mounted. The chain 111 is also trained about a sprocket secured to a conveyor driving shaft 112 which is driven by the power shaft 101 through a belt 113 (see Fig. 3).

The side conveyors 71, 72 are driven through belts 114, 115 (see Fig. 3) which are powered by the belts 108, 109 respectively. Each of the belts 114, 115 is connected by suitable worm gearing, not shown, to the upstanding shafts 77 about which the forward ends of the conveyors 71, 72 are trained.

The endless conveyor 18 is driven by a chain 116 (see Fig. 3) trained about a sprocket secured to an elongated portion of the lower spindle shaft 82. The chain 116 is connected by means of worm gearing 117 to a shaft 118 about which the chains 91, 92, comprising the conveyor 18, are mounted at their lower ends.

Entirely surrounding and enclosing the lower operative portions of the harvester 10 is a suitable enclosure 120 (see Figs. 1 and 2).

It can be seen from the drawings and the above disclosure that an economical and efficient sugar cane harvesting machine can be easily provided by simply mounting the novel harvester 10 on the side of any conventional tractor to which any suitable loading trailer has been hitched. The harvester 10 is preferably completely self-powered through a common drive system, as above described, and therefore requires only a two-point connection with the tractor to which it is coupled.

It will be appreciated that each of the elements making up the harvester 10 is simply formed from a minimum of parts so that the entire machine is relatively light. This construction permits the harvester to be driven by a light conventional tractor over the difficult terrain encountered in cane fields and avoids the need for special tires and suspension systems often found in large and heavy sugar cane harvesters.

We claim as our invention:

1. For use in a cane harvester or the like, a chopping mechanism comprising a pair of parallel spindles having driving means connected thereto to drive the same in unison in opposite directions, each spindle having a pair of elongated diametrically opposed, cutting blades, guiding discs fixed on each spindle adjacent the respective ends of the blades so as to define a cane path through the chopping mechanism, the blades on the spindles being arranged in opposition whereby upon rotation of said spindles, opposed blades will coact to grip, cut and throw cane or the like rearwardly therefrom.

2. In a cane harvesting machine, the combination comprising an apron conveyor for receiving severed cane and carrying it rearwardly of the machine, side conveyers at either side of said apron conveyor driven so as to urge the severed cane rearwardly of the machine, an upper cane feeding unit disposed above said apron conveyor so as to knock down severed cane disposing it axially with respect to its direction of movement, said upper cane feeding unit being driven so as to urge cane in engagement therewith rearwardly of the machine, a chopping mechanism at the rear of said apron conveyor for cutting the cane into short lengths, said mechanism including a pair of parallel spindles having driving means connected thereto to drive the same in unison in opposite directions, each spindle having a pair of elongated, diametrically opposed, cutting blades, guiding discs fixed on each spindle adjacent the respective ends of the blades so as to define a cane path through the chopping mechanism, the blades on the spindles being arranged in opposition whereby upon rotation of said spindles, opposed blades will coact to grip, cut and throw cane or the like rearwardly therefrom, and said apron conveyor, side conveyors and upper feeding unit being arranged to direct the cane between said guiding discs.

3. An apparatus for enabling a tractor having a trailer hitched thereto to operate as a complete sugar cane harvesting machine comprising, in combination, a generally U-shaped frame having releasable means for securing the frame ends to said tractor so that the frame extends laterally from the side of said tractor, a ground engaging wheel journaled on said frame for supporting the outboard side thereof, a rotary top cutter carried on the frame to extend forwardly above said frame, a rotary cane cutter carried at the forward edge of said frame so as to extend generally parallel to and closely spaced above the ground, said cane cutter being driven so as to sever and throw rearwardly standing cane, said top cutter extending forwardly of said cane cutter so as to tilt the cane forwardly as it is harvested, an endless apron conveyor rotatably mounted on said frame and extending longitudinally thereof, a chopping mechanism supported by the frame at the rear of said conveyor, said chopping mechanism including a pair of parallel spindles having driving means connected thereto to drive the same in unison in opposite directions, each spindle having a pair of elongated, diametrically opposed, cutting blades, guiding discs fixed on each spindle adjacent the respective ends of the blades so as to define a cane path through the chopping mechanism, the blades on the spindles being arranged in opposition whereby upon rotation of said spindles, opposed blades will coact to grip, cut and throw cane or the like rearwardly therefrom, said apron conveyor being inclined upwardly from said cane cutter to said chopping mechanism so as to receive the cut bottoms of the tilted cane and carry the cane horizontally to the chopping cutters, side and top conveyors mounted on said frame on either side and above said apron conveyor so that the cane being carried to the chopping mechanism is guided and urged along on all sides by elements moving in the same direction as the cane, and a discharge conveyor carried on said frame and positioned rearwardly of said chopping mechanism for receiving severed cane segments thrown thereby and depositing them in said trailer.

References Cited in the file of this patent

UNITED STATES PATENTS

| Number | Name | Date |
| --- | --- | --- |
| 160,945 | Ockershausen | Mar. 16, 1875 |
| 1,304,034 | Edwards | May 20, 1919 |
| 1,908,966 | Falkiner et al. | May 16, 1933 |
| 1,975,089 | Falkiner et al. | Oct. 2, 1934 |
| 2,482,530 | Wurtele | Sept. 20, 1949 |